(12) United States Patent
Carpenter (10) Patent No.: US 10,014,734 B2
(45) Date of Patent: Jul. 3, 2018

(54) ELECTRIC CURRENT GENERATOR/MOTOR WITH DUAL STATIONARY/ROTATING STATORS AND ROTOR HAVING HORSESHOE MAGNET/ELECTROMAGNETIC COILS

(71) Applicant: Larry Carpenter, Jupiter, FL (US)

(72) Inventor: Larry Carpenter, Jupiter, FL (US)

(*) Notice: Subject to any disclaimer, the term of this patent is extended or adjusted under 35 U.S.C. 154(b) by 129 days.

(21) Appl. No.: 14/677,606

(22) Filed: Apr. 2, 2015

(65) Prior Publication Data

US 2015/0288228 A1  Oct. 8, 2015

Related U.S. Application Data

(60) Provisional application No. 61/974,209, filed on Apr. 2, 2014.

(51) Int. Cl.
| | |
|---|---|
| *H02K 1/00* | (2006.01) |
| *H02K 1/06* | (2006.01) |
| *H02K 19/10* | (2006.01) |
| *H02K 21/26* | (2006.01) |
| *H02K 19/22* | (2006.01) |

(Continued)

(52) U.S. Cl.
CPC ............... *H02K 1/06* (2013.01); *H02K 1/141* (2013.01); *H02K 19/10* (2013.01); *H02K 19/22* (2013.01); *H02K 21/26* (2013.01); *H02K 1/148* (2013.01); *H02K 1/32* (2013.01); *H02K 7/1807* (2013.01); *H02K 21/18* (2013.01); *H02K 21/32* (2013.01); *H02K 21/325* (2013.01); *H02K 21/36* (2013.01)

(58) Field of Classification Search
CPC ........ H02K 21/26; H02K 21/24; H02K 21/32; H02K 21/36; H02K 21/325; H02K 21/18; H02K 1/141; H02K 1/143
USPC .............. 310/209, 113, 49.39, 216.008, 266, 310/102 R, 101, 68 R; 290/52
See application file for complete search history.

(56) References Cited

U.S. PATENT DOCUMENTS 3,239,702 A * 3/1966 Van De Graaff ...... H02K 19/24
310/168
7,608,962 B2 * 10/2009 Franke ................... H02K 16/02
310/114

(Continued)

FOREIGN PATENT DOCUMENTS

| EP | 0495582 | 7/1992 |
|---|---|---|
| EP | 2081276 | 7/2009 |

(Continued)

*Primary Examiner* — Bernard Rojas
*Assistant Examiner* — Maged Almawri
(74) *Attorney, Agent, or Firm* — McHale & Slavin, P.A.

(57) ABSTRACT

An electromagnetic device is provided. It includes a plurality of input magnetic field generating devices, which will induce magnetic fields in output current generating devices. In one construction, the electromagnetic device can be operably coupled to a work input device wherein the electromagnetic device can be used as a generator set in combination with the energy input device. The input and output magnetic devices are arranged in radial arrays about a work input shaft. The output magnetic devices each include a core and a respective coil with the cores each having a longitudinal axis generally parallel to the axis of rotation of the shaft. The input devices and the output devices are mounted in respective carriers with the output device carrier being movable relative to the input device carrier.

16 Claims, 7 Drawing Sheets

(51) Int. Cl.
H02K 1/32 (2006.01)
H02K 21/32 (2006.01)
H02K 21/36 (2006.01)
H02K 21/18 (2006.01)
H02K 1/14 (2006.01)
H02K 7/18 (2006.01)

(56) References Cited

U.S. PATENT DOCUMENTS

| | | | |
|---|---|---|---|
| 8,242,653 B2* | 8/2012 | Ichiyama | H02K 16/00 310/156.44 |
| 2006/0125243 A1* | 6/2006 | Miller | F03D 1/025 290/55 |
| 2009/0251021 A1* | 10/2009 | Atarashi | H02K 1/2793 310/156.07 |
| 2011/0025067 A1* | 2/2011 | Cipriani | H02K 7/1823 290/52 |
| 2011/0109185 A1* | 5/2011 | Sullivan | H02K 21/026 310/156.35 |
| 2014/0265696 A1* | 9/2014 | Copeland, Jr. | H02K 21/44 310/154.02 |

FOREIGN PATENT DOCUMENTS

| | | | |
|---|---|---|---|
| EP | 2611007 | 7/2013 | |
| EP | 2611007 A2 * | 7/2013 | H02K 55/02 |

* cited by examiner

ELECTRIC CURRENT GENERATOR/MOTOR WITH DUAL STATIONARY/ROTATING STATORS AND ROTOR HAVING HORSESHOE MAGNET/ELECTROMAGNETIC COILS

RELATED APPLICATIONS

In accordance with 37 C.F.R 1.76, a claim of priority is included in an Application Data Sheet filed concurrently herewith. Accordingly, the present invention claims priority under 35 U.S.C. § 119(e), 120, 121, and/or 365(c) of U.S. Patent Application No. 61/974,209, filed Apr. 2, 2014, entitled, "Electric Current Generator", the contents of the above referenced application is herein incorporated by reference in its entirety.

FIELD OF THE INVENTION

The present invention relates to a generator for the production of electrical current.

BACKGROUND OF THE INVENTION

Generators for the production of electrical current are well known in the art. They use a rotor and a stator, with one moving relative to the other, and have coils producing magnetic fields in non-permanent magnets. By rotation of the rotor relative to the stator, with a source of input work, the work input is converted to electrical current. These types of prior art generators are basically of the same general construction even though there may be some minor differences in their construction. Typically, magnetic fields are produced in the stator by coils or field windings wrapped around magnetic material. Upon energizing of the windings with electric current, the magnetic material becomes magnetized, which in turn produces a magnetic field. The magnets that are formed by such a construction are typically non-permanent magnets, although permanent magnets can be used. In the normal construction, the stator magnets are stationary relative to the generator housing and the ground. The rotor also has coils surrounding magnetic material, and when the rotor magnetic material moves through the magnetic fields formed by the stator magnets, current is induced in the rotor coils to produce an electrical current. The produced current is fed from the generator from a collection device such as slip rings.

There are several types of electromagnetic generators including dynamos, alternators, induction generators and the like. While there are differences, they all have a stator and a rotor with the stator circumferentially surrounding the rotor and sharing a common longitudinal axis.

These generators are effective at producing electrical current through work input to the rotor to move it through various magnetic fields induced by the magnets in the stator. While effective, the basic structure of the generator has not changed, i.e., a stator surrounding the rotor. However, the rotors have complex and convolute wire windings forming their field windings.

SUMMARY OF THE INVENTION

The present invention provides a generator that reorients the position of the rotor relative to the stator and thereby simplifies the construction of a generator.

It is a further objective of the instant invention that allows all of the magnetic devices carried by the rotor to simultaneously generate a current or generate a current in any desired number simultaneously, or in any desired sequence.

It is yet another objective of the present invention to provide a first carrier having a plurality of magnetic devices operably associated therewith, said first carrier has at least two portions in axially spaced apart relationship. Each of the portions has at least two of the magnetic devices carried thereby. The magnetic devices have end portions positioned at ends of a space between the two portions with the ends of the magnetic devices on one of the portions lying in a plane generally parallel to the ends of the magnetic devices on the other portion. A second carrier has a plurality of magnetic devices carried thereby. The second carrier is at least partially positioned in the space between the first carrier portions and has the ends of its magnetic devices in a position to move by the ends of the respective first carrier magnetic devices. One of the first and second carriers is mounted to rotate relative to the other of the first and second carriers about an axis with the axis of rotation being generally normal to said plane, whereby upon relative rotation, an electric current can be generated.

A further objective of the present invention is to provide a unique structure for an electric motor.

Yet a further objective of the present invention is to provide an electric motor having a first carrier with two portions in an axially spaced relationship with a second carrier positioned between the spaced apart portions for rotation about an axis.

Still yet a further objective of the present invention is to provide a first carrier having a plurality of magnetic devices operably associated therewith, said first carrier has at least two portions in axially spaced apart relationship. Each of the portions has at least two of the magnetic devices carried thereby. The magnetic devices have end portions positioned at ends of a space between the two portions with the ends of the magnetic devices on one of the portions lying in a plane generally parallel to the ends of the magnetic devices on the other portion. A second carrier has a plurality of magnetic devices carried thereby. The second carrier is at least partially positioned in the space between the first carrier portions and has the ends of its magnetic devices in a position to move by the ends of the respective first carrier magnetic devices. One of the first and second carriers is mounted to rotate relative to the other of the first and second carriers about an axis with the axis of rotation being generally normal to said plane, whereby upon relative rotation, an electric current can be generated.

An even further objective of the present invention is to provide a magnetic device that can be used alternately as a motor and a generator.

Other objects and advantages of this invention will become apparent from the following description taken in conjunction with any accompanying drawings wherein are set forth, by way of illustration and example, certain embodiments of this invention. Any drawings contained herein constitute a part of this specification and include exemplary embodiments of the present invention and illustrate various objects and features thereof.

Other objects and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objectives and features thereof.

DETAILED DESCRIPTION OF THE INVENTION

Figure 1:
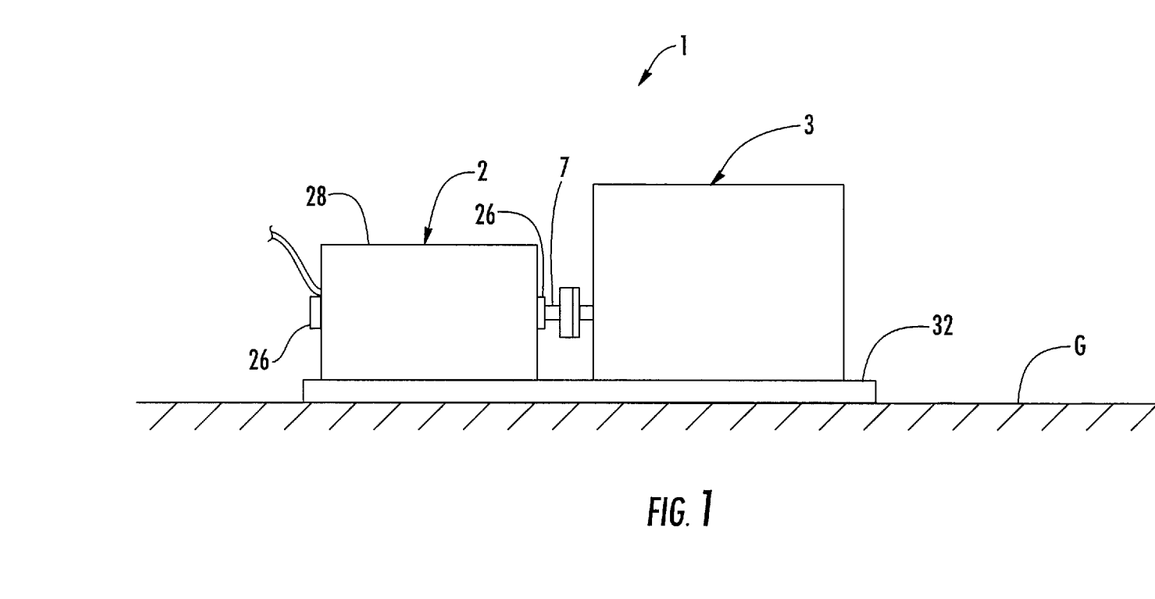
FIG. 1 is a schematic elevation view of a generator set.
Figure 2:
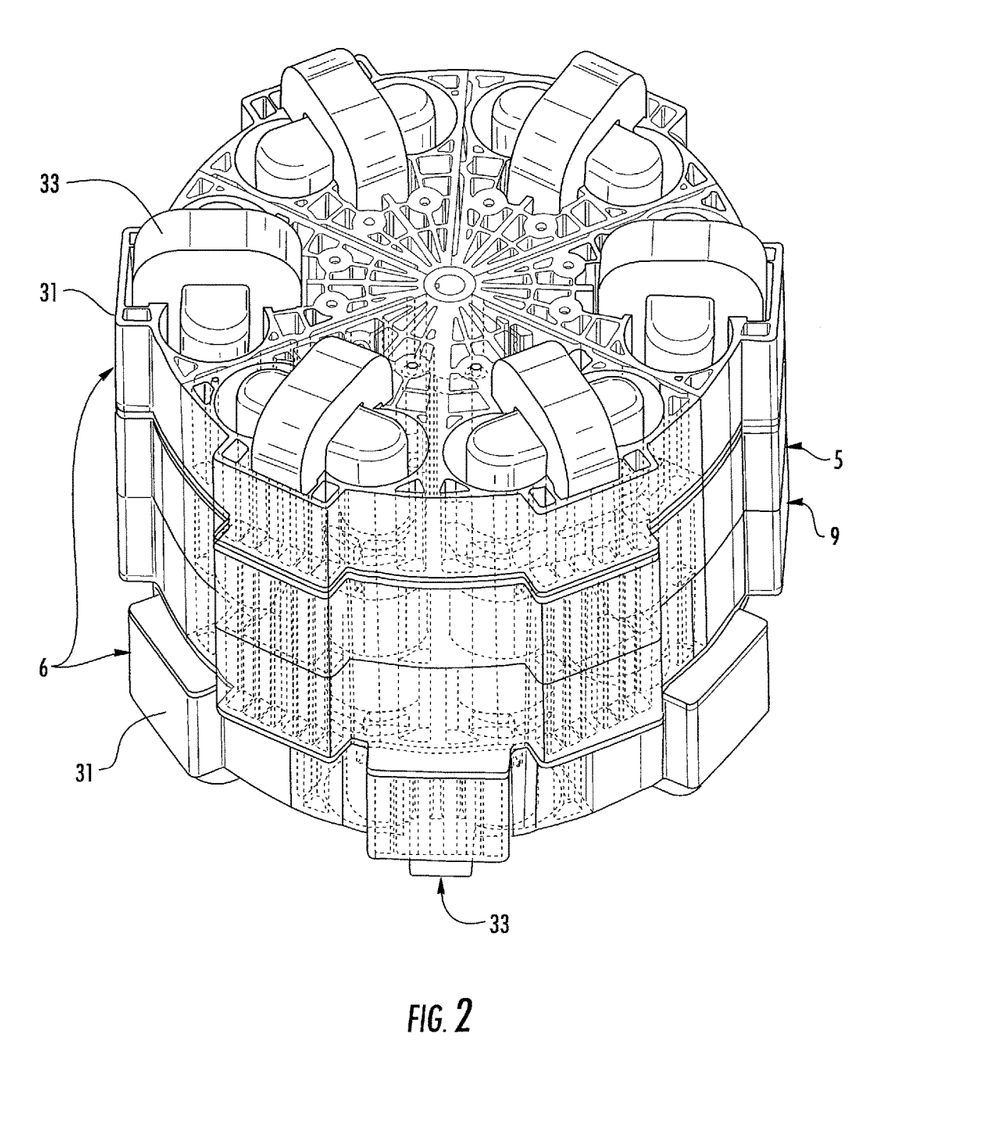
FIG. 2 is a perspective view showing a stator and a rotor assembled for operation.

In general, the device 1 is an electromagnetic generator system that includes an electromagnetic generator 2 and a drive device 3 drivingly coupled thereto, FIG. 1. The drive device 3 can be any suitable device such as an internal combustion engine, a turbine, a water wheel, a steam engine, a wind generator fan or the like. The drive device 3 provides energy or work input into the generator 2 in the form of rotation, which in turn produces an electrical current when being driven or rotated. The work input from the drive device 3 is converted to electrical current by the generator 2. The generator 2 can be constructed to produce DC current, which can then be converted to AC current as is known in the art. Alternately, the generator 2 can be an AC generator. Alternatively, the present device can be connected to a source of electrical power whereby the device can function as an electric motor to provide rotating motive force for work. In yet another alternative embodiment, the present device can be used alternately as a generator and a motor such as in a hybrid vehicle. In this embodiment, when used as a motor the device can propel the vehicle to a desired velocity while generating power during dynamic braking operations to recharge batteries, capacitors or the like.

The generator/motor 2 functions basically as any other generator, but utilizes a substantially different arrangement of component parts. A generator/motor 2 is comprised of a rotor 5 and a stator 6, see FIGS. 2-5. In operation, the stator 6 is stationary relative to the ground G while the rotor 5 moves when driven by the device 3. In the illustrated structure, the rotor 5 is the component in which the electrical current is generated while the stator 6 is the component that provides electromagnetic field input. However, it is to be understood that these two components could be reversed for driving movement and still provide an operable generator.

As described above, the generator/motor 2 includes both a rotor 5 and a stator 6. For the purposes of this description, it will be assumed that the rotor 5 and current output component is the component that is going to be moved, and the stator 6, the magnetic field generating component, remains stationary during operation. The rotor 5 is mounted on a shaft 7 for rotation therewith. The shaft 7 can be operably coupled to the drive 3 in any suitable manner. The shaft 7 can be mounted in a suitable bearing arrangement for low friction rotation. The shaft 7 has a longitudinal axis A-A, which is also its axis of rotation. The rotor 5 includes a carrier 9 mounted to the shaft 7 for rotation therewith. The shaft 7 has opposite end portions extending longitudinally from opposite sides or ends of the carrier 9. The carrier 9 extends radially outwardly from the shaft 7 and is adapted to carry a plurality of magnetic devices 11. In the illustrated structure, magnetic devices 11 each include a core 14 made out of a magnetic material, i.e., material capable of being magnetized such as iron or an iron alloy. Preferably, the magnetic material is such as to form a non-permanent magnet when subjected to a magnetic field, but is adapted for being temporarily magnetic. Each of the cores 14 is operably associated with a field winding or coil 15, which is operable for having an electric current induced therein when its respective core 14 is magnetized by movement through a magnetic field. The magnetic field is formed when the core 14 is positioned adjacent to a magnetic device described below. As seen, there is a plurality of cores 14 and respective coils 15 positioned circumferentially about the carrier 9, and spaced radially outwardly from the axis A-A. It is preferred that immediately adjacent coils 15 are sufficiently close as to synergistically couple to share each other's electromagnetic field. It is also preferred that the coils 15 lie in a common radial or transverse plane, P-P, FIG. 5, generally perpendicular to the axis A-A. It is also preferred that the longitudinal axes of the cores 14 be equally spaced circumferentially about the carrier 9, a spacing designated X, FIG. 6. These longitudinal axes are preferably generally parallel to the axis A-A.

Figure 3:
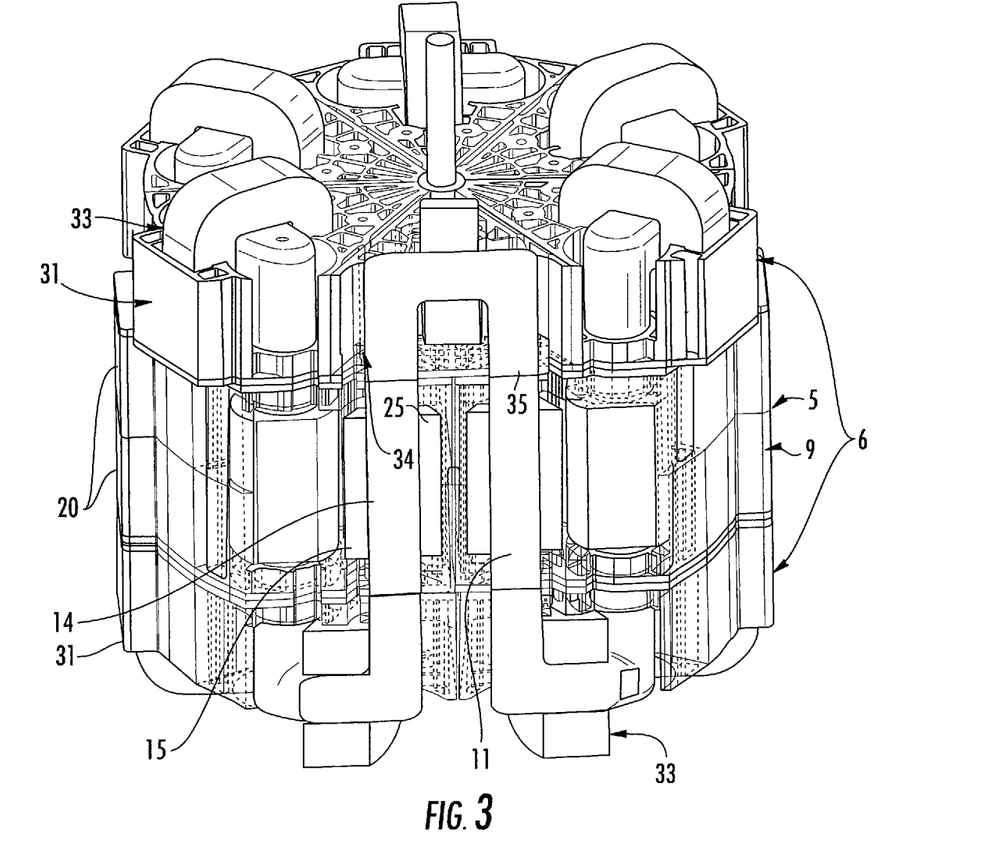
FIG. 3 is a fragmentary perspective view of the stator and rotor with portions broken away to show internal details of the arrangement of magnetic devices.
Figure 4:
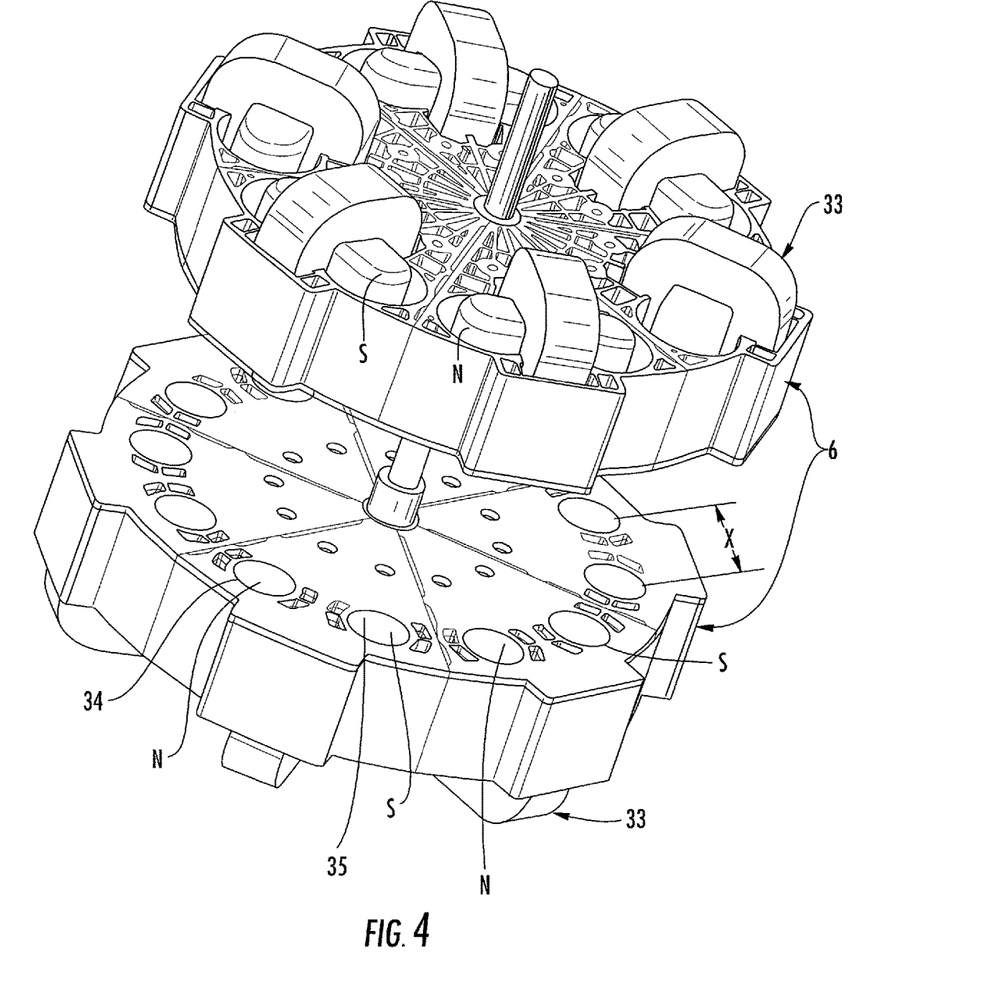
FIG. 4 is a fragmentary perspective view of the stator.
Figure 5:
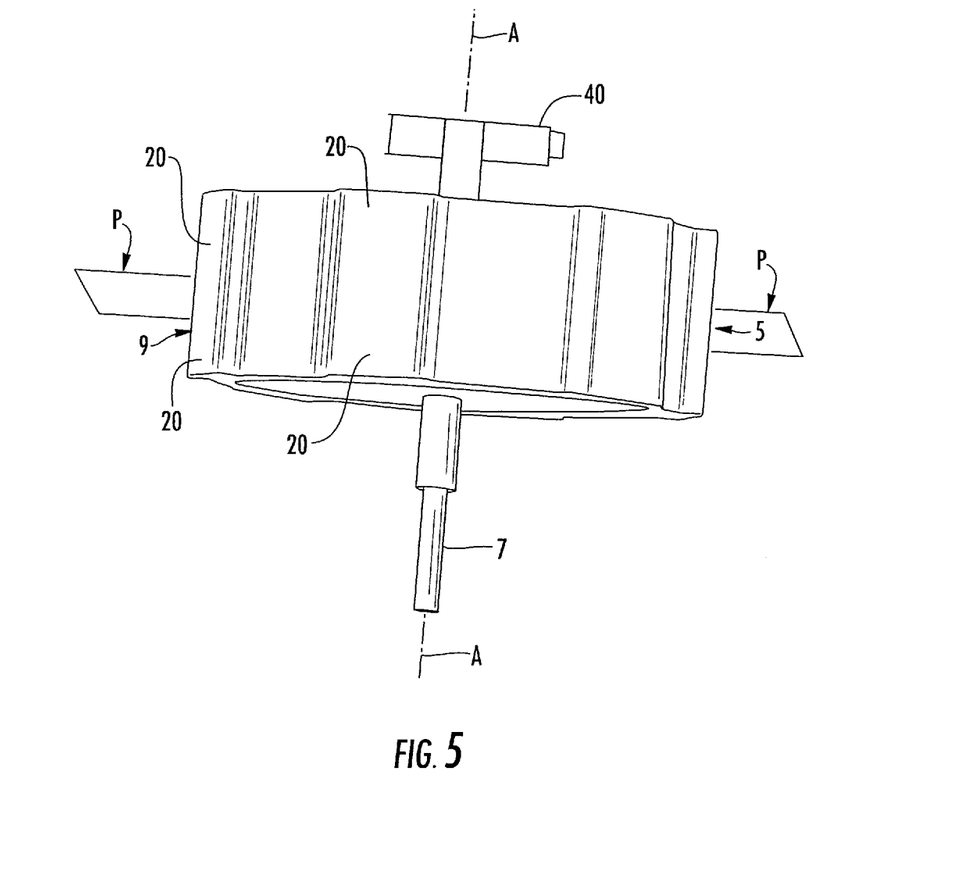
FIG. 5 is a fragmentary perspective view of the rotor.
Figure 6:
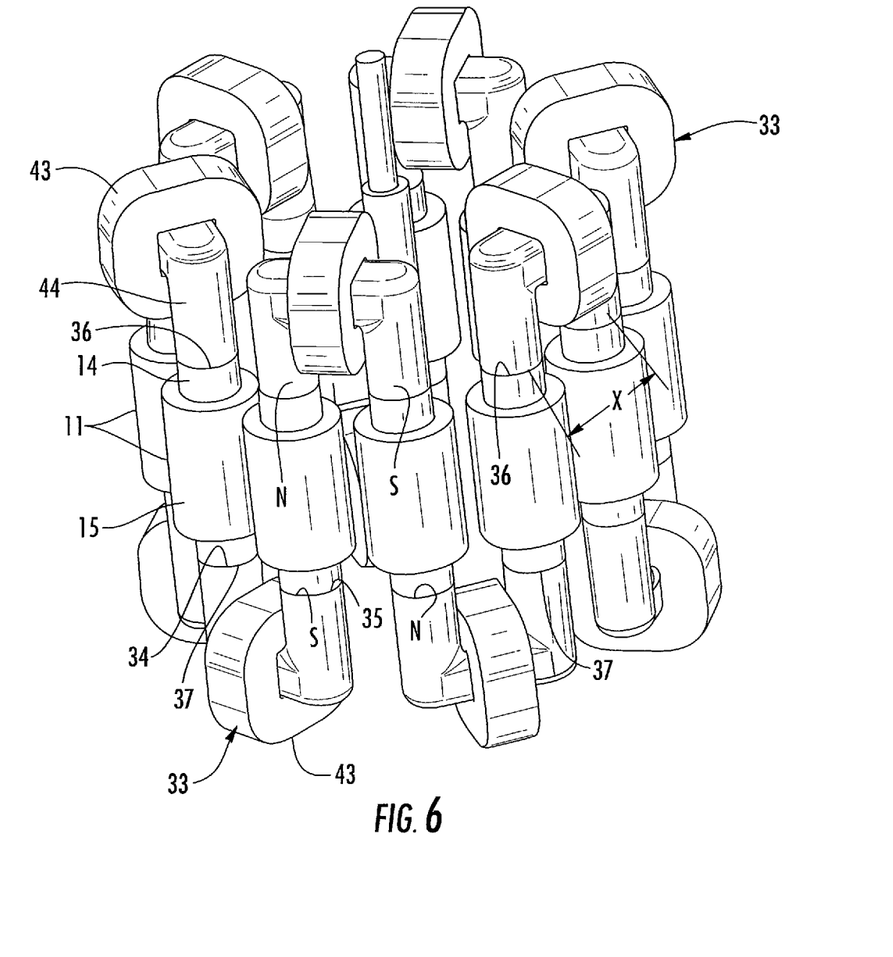
FIG. 6 is a fragmentary perspective view of the arrangement of magnetic devices.
Figure 7:
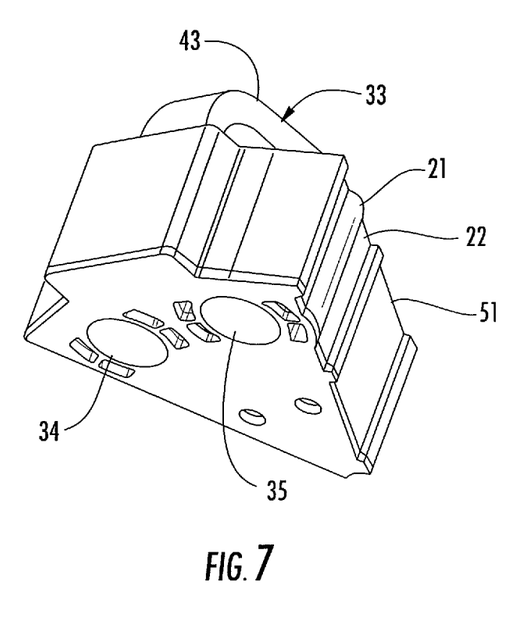
FIG. 7 is a fragmentary perspective view of a pie shaped segment used to form the stator and the rotor.

The rotor 5, in a preferred embodiment, is comprised of a plurality of pie or wedge shaped sections 20, FIGS. 3, 5. These pie shaped sections 20 extend radially outwardly from the axis A-A and are positioned circumferentially thereabout. Each of the sections 20 has mounted therein a respective magnetic device 11. The sections 20 can be suitably secured to one another to facilitate manufacture of the rotor 5. Securement can be with mechanical fasteners, adhesive, welding or the like. Also, it is preferred that the sections 20 be keyed to one another to facilitate assembly of the rotor 5 and to help maintain an integral structure for the rotor 5. As shown, each of the sections 20 has either a rib 21 or groove 22, as seen on section 51 (FIG. 7) described below, positioned adjacent to one another for the receipt of a rib into a respective groove of the adjacent section 20 to fix the adjacent sections 20 relative to one another. It is also preferred that the sections be made of a non-magnetic material such as aluminum alloy or plastic and can be formed by die-casting or molding respectively. In a preferred embodiment, the rotor 5 is comprised of a pair of layers of sections 20 to facilitate assembly of the magnetic devices 11 therein. The magnetic devices 11 are mounted in through bores 25 that are of two different diameters to accommodate both the diameter of the core 14 and larger diameter of the coil 15, FIG. 3.

The rotor 5 is suitably carried for low friction rotation. As shown, the shaft 7 is operably associated on each end thereof with suitable bearings 26, FIG. 1. The bearings 26 may be ball or roller bearings, and may be permanently lubricated or be provided with a lubrication device. The bearings 26 are also carried by a suitable support, such as a housing 28, which encloses both the rotor 5 and stator 6 entirely or substantially entirely. Such housings are well known in the art. If the generator/motor 2 is to be used outside in the weather, then it is preferred that the housing 28 be at least resistant to the elements, for example rain. A cooling device, not shown, can also be provided as is known in the art. Such cooling devices can take the form of an internal or external fan that will provide forced convection cooling of the generator/motor 2. Alternatively, liquids may be utilized for cooling as is known in the art whereby, liquid is circulated through channels or conduits for cooling the various component parts of the device.

The stator 6 in the illustrated structure includes a carrier 31 positioned at each end of the carrier 9. The carriers 31, as shown, have the same construction. In operation of the illustrated structure, the carriers 31 are stationary relative to the ground G or a support frame 32, while the rotor 5 with its carrier 9 are movable relative to the carriers 31 and the frame 32. The carriers 31 each carry a plurality of magnetic devices 33. Preferably, the magnetic devices 33 are of an electromagnetic type, but it is to be understood that they could be of a permanent magnet type. Each of the magnetic devices 33 has end portions 34, 35 that are polarized S or N respectively. It is preferred that the magnetic devices 33 on each carrier 31 have the ends 34, 35 positioned in a circular or circumferential array about axis A-A with the ends alternating S-N-S-N and so on around the array. The ends 34, 35 of a magnetic device 33 on one carrier are polarized oppositely to the ends 34, 35 of a magnetic device 33 on the other carrier so that a core 14 has its opposite ends 36, 37 exposed to opposite polarizations as described below. As best seen in FIG. 3, the magnetic devices 33 on one of the carriers 31 and the magnetic devices 33 on the other of the carriers 31 should preferably be in axial alignment so as to be adjacent to a respective end of a respective core 14 simultaneously during rotation of the rotor 5. During operation, opposite ends 36, 37 of one core 14 have the magnetic devices 33 configured such that one end of the core 14 will be exposed to an N polarization while the other end is exposed to an S polarization. In operation, when a core 14 passes a respective pair of ends 34 (on one carrier 31), 35 (on the other carrier), a current is induced in a respective coil 15 for the production of an electrical current therein. The electrical current produced thereby is conducted from the generator/motor 2 for use via a suitable transfer device 40 such as a commutator or slip rings (shown schematically in FIG. 5). Such current conduction of devices is well known in the art. In a preferred embodiment, the ends 34, 35 are equally spaced circumferentially on both of the carriers 31, whereby in operation, all of the cores 14 are entering and exiting the influence of the magnetic devices 33 simultaneously. While not wishing to be bound by any theory, it is believed that such an arrangement improves the operating efficiency of the generator/motor 2. The ends 34, 35 on each carrier 31 lie in a plane generally parallel to plane P-P, the ends 36 lie in a plane generally parallel to plane P-P, and the ends 37 lie in a plane generally parallel to plane P-P.

In a preferred embodiment, the magnetic devices 33 are electromagnets. Whether of the electromagnetic type or the permanent type, the magnetic devices 33 are U-shaped or also sometimes referred to as horseshoe shaped. This way, the ends 34, 35 have end faces generally parallel to end faces of the respective cores 14. The ends 34, 35 on each carrier lie in a plane generally parallel to the plane P, i.e., generally transverse to the axis A-A. If the magnetic devices 33 are of an electromagnetic type, they will include a field winding or coil 43 and a U-shaped core 44 as is known in the art. The coils 43 may be energized from an external source of electricity or may be energized from electrical current generated by the generator/motor 2 as is well known in the art.

In the illustrated structure, each of the carriers 31 can be constructed using pie or wedge-shaped sections 51 similar to the construction of the sections 20 and utilizing rib 21 and groove 22 arrangements. They are also preferably made of a non-magnetic material such as aluminum alloy, plastic, resin or the like. It should also be noted that the present design facilitates the control of electrical production by allowing the user to control which magnetic devices 33 are energized to induce the field into respective cores 14. It should also be noted that when the device is utilized as a motor a controller (not shown) could be utilized to synchronously control power flow from an energy source to at least the magnetic devices 33 and in some embodiment the controller would also operate control power flow to the second magnetic devices 11 to cause controlled movement of the rotor about the axis of rotation. It should further be noted that the construction of the present device allows any number or array of the magnetic devices 33, 11 to be energized at a given time allowing the torque and rotational speed of the present device to be altered in real time.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention, which are obvious to those skilled in the art, are intended to be within the scope of the following claims.

What is claimed is:

1. An electromagnetic device comprising:
   a first carrier having at least a first portion and a second portion in an axially spaced apart relationship with respect to each other, said first and said second portions of said first carrier axially aligned along an axis of rotation and secured together, said first and said second portions of said first carrier each having a plurality of a first magnetic device operably associated therewith, each said first magnetic device being U-shaped, said first magnetic devices having end portions positioned facing each other at ends of a space between said first and said second portions with the ends of said first magnetic devices on said first portion lying in a plane generally parallel and aligned to the ends of the first magnetic devices on said second portion, said first magnetic devices positioned so that the ends of one said first magnetic device in said first portion align with the one said end of two said first magnetic devices in said second portion;
   a second carrier having a plurality of a second magnetic device operably associated therewith, said second carrier being at least partially positioned in said space and positioning said plurality of said second magnetic devices in a transverse plane perpendicular to said axis of rotation and equally spaced circumferentially about said second carrier; and
   one of said first and second carriers being mounted to rotate about said axis of rotation relative to the other of said first and said second carriers with said axis of rotation being generally normal to said plane, whereby, upon said rotation, an electric current is generated and wherein at least one of said first carrier and said second carrier including a plurality of wedge shaped sections secured to each other to extend radially outwardly from said axis of rotation and positioned circumferentially thereabout to complete a full circle;

whereby a magnetic series connection of all said first magnetic devices and said second magnetic devices is completed when said first magnetic devices and said second magnetic devices align.

2. The electromagnetic device of claim 1 wherein said first carrier is fixed against rotation and said second carrier is rotatable about said axis of rotation.

3. The electromagnetic device of claim 1 wherein said second carrier is fixed against rotation and said first carrier is rotatable about said axis of rotation.

4. The electromagnetic device of claim 1 wherein said first carrier is rotatable about said axis of rotation in a first direction and said second carrier is rotatable about said axis of rotation in a second direction.

5. The electromagnetic device of claim 1 wherein said first magnetic devices in said second portion of said first carrier are positioned so that said first opposite pole aligns with a first magnetic pole of a first magnetic device positioned in said first portion of said first carrier while said first magnetic pole aligns with a first opposite magnetic pole of an adjacently positioned first magnetic device in said first portion of said first carrier.

6. The electromagnetic device of claim 1 wherein both said first carrier and said second carrier each including a plurality of wedge shaped sections secured to each other to extend radially outwardly from said axis of rotation and positioned circumferentially thereabout to complete a full circle, said wedge shaped sections of said first carrier being keyed to one another and said wedge shaped sections of the second carrier being keyed to one another.

7. The electromagnetic device of claim 1 wherein said second carrier includes a plurality of said wedge shaped sections secured to each other to extend radially outwardly from said axis of rotation to complete a full circle, each said wedge shaped section including two said second magnetic devices positioned in a radial arrangement with respect to each other.

8. The electromagnetic device of claim 7 wherein said second magnetic devices are positioned in suitable proximity with respect to each other to have overlapping electrical fields.

9. The electromagnetic device of claim 1 including a source of electrical power, said electrical power connected to said first carrier for selectively creating a magnetic field around said plurality of said first magnetic devices, said magnetic field having a strength to cause said second magnetic device in said second carrier to rotate about said axis of rotation.

10. The electromagnetic device of claim 9 including a controller for controlling power flow to said plurality of said first magnetic devices.

11. The electromagnetic device of claim 10 wherein said controller is constructed and arranged to selectively allow power to flow to each said first magnetic device on a real time basis whereby, one or more said first magnetic device may be energized.

12. The electromagnetic device of claim 1 wherein said first portion of said first carrier includes a first portion of each said first magnetic device having a first magnetic pole and said second portion of said first carrier includes a first opposite magnetic pole, whereby a magnetic field is allowed to flow between said first magnetic pole and said first opposite magnetic pole when said second magnetic device is positioned between said first magnetic pole and said first opposite magnetic pole inducing an electric field in each said second magnetic device.

13. The electromagnetic device of claim 12 wherein each said first magnetic device in said first portion of said first carrier includes said first magnetic pole and said first opposite magnetic pole in a spaced apart side by side arrangement, said second portion of said first carrier including a second first magnetic device, said second first magnetic device including a first magnetic pole and a first opposite magnetic pole in a spaced apart side by side arrangement, the end of said first opposite magnetic pole of said second first magnetic device aligned with the end of said first magnetic pole of said first magnetic device.

14. The electromagnetic device of claim 13 wherein each said first magnetic devices are electromagnetic horseshoe magnets.

15. The electromagnetic device of claim 13 wherein each said second magnetic device is a coil secured about a metal core.

16. The electromagnetic device of claim 13 wherein said first portion and said second portion of said first carrier includes a plurality of said wedge shaped sections secured to each other to extend radially outwardly from said axis of rotation to complete a full circle, each said wedge shaped section including one said first magnetic device.

* * * * *